United States Patent
Yates et al.

(10) Patent No.: US 12,422,341 B2
(45) Date of Patent: Sep. 23, 2025

(54) COMPACT INTELLIGENT AEROSOL AND FLUID MANIFOLD

(71) Applicant: PARTICLE MEASURING SYSTEMS, INC., Boulder, CO (US)

(72) Inventors: Edward Yates, Boulder, CO (US); Cary Hertert, Boulder, CO (US); Brian A. Knollenberg, Boulder, CO (US); Jonathan Skuba, Boulder, CO (US)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 584 days.

(21) Appl. No.: 17/839,897

(22) Filed: Jun. 14, 2022

(65) Prior Publication Data
US 2022/0397495 A1    Dec. 15, 2022

Related U.S. Application Data

(60) Provisional application No. 63/210,776, filed on Jun. 15, 2021.

(51) Int. Cl.
*G01N 1/26* (2006.01)
(52) U.S. Cl.
CPC ..................... *G01N 1/26* (2013.01)
(58) Field of Classification Search
CPC .......... G01N 1/26; G01N 15/065; G01N 2001/2223; G01N 2015/0038; G01N 2015/0046; G01N 2001/2285
See application file for complete search history.

(56) References Cited

U.S. PATENT DOCUMENTS

| | | | |
|---|---|---|---|
| 2,915,939 A | 12/1959 | Luik | |
| 2,956,435 A | 10/1960 | Rich | |
| 3,657,920 A * | 4/1972 | Teel | G01N 1/2202 |
| | | | 73/28.04 |
| 4,594,715 A | 6/1986 | Knollenberg | |
| 4,893,928 A | 1/1990 | Knollenberg | |
| 5,026,155 A | 6/1991 | Ockovic et al. | |
| 5,072,626 A | 12/1991 | Ensor et al. | |
| 5,084,629 A | 1/1992 | Petralli | |

(Continued)

FOREIGN PATENT DOCUMENTS

| | | |
|---|---|---|
| WO | WO 2020/102032 | 5/2020 |
| WO | WO 2021/176238 | 9/2021 |

OTHER PUBLICATIONS

International Search Report and Written Opinion, dated Sep. 27, 2022, corresponding to International Application No. PCT/US202233381, 11 pp.

(Continued)

*Primary Examiner* — Tarun Sinha
(74) *Attorney, Agent, or Firm* — LEYDIG VOIT & MAYER, LTD.

(57) ABSTRACT

A manifold system and methods of collecting samples, where the manifold system comprises multiple input sample ports and a preferably rotatable flow focusing element. The manifold system is able to sample aerosols and gases from multiple sample points, such as from cleanrooms and manufacturing environments, for collection and analysis. The flow focusing element reduces cross talk and cross contamination of particles, including nanoparticles, between different samples.

29 Claims, 8 Drawing Sheets

(56) References Cited

U.S. PATENT DOCUMENTS

| | | |
|---|---|---|
| 5,282,151 A | 1/1994 | Knollenberg |
| 5,283,199 A | 2/1994 | Bacon et al. |
| 5,671,046 A | 9/1997 | Knowlton |
| 5,675,405 A | 10/1997 | Schlidmeyer et al. |
| 5,726,753 A | 3/1998 | Sanberg |
| 5,751,422 A | 5/1998 | Mitchell |
| 5,805,281 A | 9/1998 | Knowlton et al. |
| 5,861,950 A | 1/1999 | Knowlton |
| 5,903,338 A | 5/1999 | Mavliev et al. |
| 6,067,864 A | 5/2000 | Peterson et al. |
| 6,167,107 A | 12/2000 | Bates |
| 6,275,290 B1 | 8/2001 | Cerni et al. |
| 6,615,679 B1 | 9/2003 | Knollenberg et al. |
| 6,709,311 B2 | 3/2004 | Cerni |
| 6,712,881 B2 | 3/2004 | Hering et al. |
| 6,829,044 B2 | 12/2004 | Liu |
| 6,859,277 B2 | 2/2005 | Wagner et al. |
| 6,903,818 B2 | 6/2005 | Cerni et al. |
| 6,945,090 B2 | 9/2005 | Rodier |
| 7,030,980 B1 | 4/2006 | Sehler et al. |
| 7,088,446 B2 | 8/2006 | Cerni |
| 7,088,447 B1 | 8/2006 | Bates et al. |
| 7,208,123 B2 | 4/2007 | Knollenber et al. |
| 7,235,214 B2 | 6/2007 | Rodier et al. |
| 7,456,960 B2 | 11/2008 | Cerni et al. |
| 7,667,839 B2 | 2/2010 | Bates |
| 7,719,683 B2 | 5/2010 | Ahn |
| 7,746,469 B2 | 6/2010 | Shamir et al. |
| 7,796,255 B2 | 9/2010 | Miller |
| 7,973,929 B2 | 7/2011 | Bates |
| 7,985,949 B2 | 7/2011 | Rodier |
| 8,109,129 B2 | 2/2012 | Gorbunov |
| 8,174,697 B2 | 5/2012 | Mitchell et al. |
| 8,194,234 B2 | 6/2012 | Hopke et al. |
| 8,208,132 B2 | 6/2012 | Huetter et al. |
| 8,250,937 B2 * | 8/2012 | Wynn .................... C12M 23/40 422/546 |
| 8,427,642 B2 | 4/2013 | Mitchell et al. |
| 8,465,791 B2 | 6/2013 | Liu et al. |
| 8,711,338 B2 | 4/2014 | Liu et al. |
| 8,800,383 B2 | 8/2014 | Bates |
| 8,869,593 B2 | 10/2014 | Gorbunov et al. |
| 9,141,094 B2 | 9/2015 | Pariseau et al. |
| 9,157,847 B2 | 10/2015 | Pariseau et al. |
| 9,158,652 B2 | 10/2015 | Pariseau |
| 9,631,222 B2 | 4/2017 | Ketcham et al. |
| 9,638,665 B2 | 5/2017 | Gorbunov et al. |
| 9,808,760 B2 | 11/2017 | Gromala et al. |
| 9,810,558 B2 | 11/2017 | Bates et al. |
| 9,885,640 B2 | 2/2018 | Ketcham et al. |
| 9,989,462 B2 | 6/2018 | Lumpkin |
| 10,197,487 B2 | 2/2019 | Knollenber et al. |
| 10,228,316 B2 | 3/2019 | Bergmann et al. |
| 10,330,578 B2 | 6/2019 | Manautou et al. |
| 10,488,313 B2 | 11/2019 | Moenkemoeller |
| 10,520,414 B2 | 12/2019 | Avula et al. |
| 10,578,539 B2 | 3/2020 | Remiarz et al. |
| 10,792,694 B2 | 10/2020 | Gorbunov et al. |
| 10,859,487 B2 | 12/2020 | Knollenberg et al. |
| 10,914,667 B2 | 2/2021 | Avula et al. |
| 10,921,229 B2 | 2/2021 | Shamir |
| 10,928,293 B2 | 2/2021 | Knollenberg et al. |
| 10,983,040 B2 | 4/2021 | Pariseau |
| 10,997,845 B2 | 5/2021 | MacLaughlin et al. |
| 11,169,070 B2 | 11/2021 | Berger et al. |
| 11,181,459 B2 | 11/2021 | Oberreit |
| 11,215,546 B2 | 1/2022 | MacLaughlin |
| 11,231,345 B2 | 1/2022 | Scialo et al. |
| 11,237,095 B2 | 2/2022 | Rodier et al. |
| 11,255,760 B2 | 2/2022 | Scialo et al. |
| 11,268,930 B2 | 3/2022 | Rodier et al. |
| 11,320,360 B2 | 5/2022 | Lumpkin et al. |
| 11,385,161 B2 | 7/2022 | Bates et al. |
| 11,416,123 B2 | 8/2022 | Pandolfi et al. |
| 11,428,617 B2 | 8/2022 | Knollenberg et al. |
| 2007/0137283 A1 | 6/2007 | Giandomenico et al. |
| 2008/0037004 A1 | 2/2008 | Shamir et al. |
| 2009/0009748 A1 | 1/2009 | Ahn |
| 2011/0203931 A1 | 8/2011 | Novosselov et al. |
| 2013/0227929 A1 * | 9/2013 | Kulkarni ............ G01N 33/0016 73/31.05 |
| 2015/0075301 A1 | 3/2015 | Scialo et al. |
| 2016/0300466 A1 | 10/2016 | Williamson |
| 2017/0241893 A1 | 8/2017 | Walls et al. |
| 2020/0072724 A1 | 3/2020 | Knollenberg et al. |
| 2020/0240896 A1 | 7/2020 | Karasikov et al. |
| 2021/0025806 A1 | 1/2021 | Pariseau et al. |
| 2021/0044978 A1 | 2/2021 | Michaelis et al. |
| 2021/0088437 A1 | 3/2021 | Pariseau et al. |
| 2021/0136722 A1 | 5/2021 | Scialo et al. |
| 2021/0208054 A1 | 7/2021 | Ellis et al. |
| 2021/0223273 A1 | 7/2021 | Scialo et al. |
| 2021/0356374 A1 | 11/2021 | Han |
| 2021/0381948 A1 | 12/2021 | Rodier et al. |
| 2022/0397510 A1 | 12/2022 | Yates et al. |
| 2022/0397519 A1 | 12/2022 | Knollenberg et al. |

OTHER PUBLICATIONS

U.S. Appl. No. 17/839,839, filed Jun. 14, 2022.
U.S. Appl. No. 17/839,565, filed Jun. 14, 2022.
Extended European Search Report, dated May 19, 2025, corresponding to European Application No. 22825646.7.

* cited by examiner

COMPACT INTELLIGENT AEROSOL AND FLUID MANIFOLD

CROSS-REFERENCE TO RELATED APPLICATIONS

This application claims the benefit of priority to U.S. Provisional Patent Application No. 63/210,776, filed Jun. 15, 2021, which is hereby incorporated by reference in its entirety.

BACKGROUND OF THE INVENTION

This invention is generally in the field of sampling, collecting and analyzing aerosols and gases, including the collection of samples for the detection of particles and other contaminants in a range of cleanroom and manufacturing environments.

Monitoring gas and fluid streams for the presence of particles (especially those having a size range between 0.1 µm and 5 µm) and ultrafine particles (particles smaller than 0.1 µm), is of great importance in various industries, such as in pharmaceutical and semiconductor manufacturing, because the presence of particles in the environment can detrimentally affect the manufacturing process and run afoul of regulatory requirements. As a result, cleanrooms and clean zones are commonly used in semiconductor and pharmaceutical manufacturing facilities. For the semiconductor industry, an increase in airborne particulate concentration can result in a decrease in fabrication efficiency, as particles that settle on semiconductor wafers will impact or interfere with the small length scale manufacturing processes. For the pharmaceutical industry, contamination by airborne particulates and biological contaminants puts pharmaceutical products at risk for failing to meet standards established by the US Food and Drug Administration (FDA) and other foreign and international health regulatory agencies.

Standards for the classification of cleanroom particle levels as well as standards for testing and monitoring to ensure compliance are provided by ISO 14664-1 and 14664 2. Similarly, ISO 14698-1 and 14698-2 provide standards for the evaluation of cleanroom and clean zone environments for biocontaminants. To meet these and other standards, particle counters are commonly used to determine the airborne particle contamination levels in cleanrooms and clean zones. In many cases, a particle counter having multiple input ports is used to collect samples from multiple areas in the environment or even from multiple cleanrooms and clean zones. However, the collection pathways from each collection site must be kept sufficiently isolated from one another in order to prevent cross talk of collected particles and cross contamination of samples. Often times such systems are not able to prevent cross contamination of nanoparticles and/or require the sampling system to significantly alter the flow rate of the air or gas being sampled. Additionally, conventional manifold systems are not able to quickly sample multiple different sample points while preventing cross talk and cross contamination.

For example, sampling nanoparticles in a manifold system poses problems in that particle movement from one airflow pathway to another is a function of diffusion, which is often difficult to control. This diffusion results in cross contamination between the different manifold pathways, and can prevent accurate sampling of the intended particles captured in the sample airflow of interest.

Presently there are no aerosol manifolds in the art that allow for the effective transport and sampling of nanoparticles. Conventional aerosol manifolds are designed for transport and sampling of particles equal to and larger than 100 nm and minimize cross talk between different sampling ports through the utilization of fractional flow sipper tubes which minimize crosstalk due to momentum of particles, but does little to eliminate Brownian motion of nanoparticles.

Current market leading aerosol manifolds not designed for the sampling of nanoparticles are marketed with cross talk rates of 0.01% for particles greater than 100 nm. However, internal testing shows that those current market leading aerosol manifolds can fail to live up to their marketed cross talk rate often greater than an order of magnitude worse than advertised. The cross talk performance of nanoparticles less than 100 nm in such systems are even worse, as these systems are not designed for these smaller particles.

Accordingly, what is needed is an improved manifold system able to take aerosol and gas samples from multiple sample points and reduce cross talk and cross contamination between different samples.

SUMMARY OF THE INVENTION

The present invention provides a multipoint sampling manifold and methods of collecting samples. The manifold is able to sample aerosols, air and other gases from multiple points within a sampling area and transport the sampled aerosol, air or gas to a particle counter or other type of analyzing device, or to a transport or storage container. The sampling manifold of the present invention is particularly useful in sampling air and gas for the detection, collection and analysis of particles, including biological particles and particles having sub 10 nm particle size and greater, and for the detection and analysis of individual component gases within the sampled air and gas.

In an embodiment, the present invention provides a sampling manifold comprising: a) two or more input sampling ports; b) a sealed bulk flow section connected to the two or more input sampling ports, wherein gas flowing through the two or more input sampling ports enters the sealed bulk flow section; c) a flow focusing element inside the sealed bulk flow section, the flow focusing element comprising a plurality of flow ports, wherein the flow ports are in fluid communication with the input sampling ports; and d) a sample line in fluid communication with a flow port selected from the plurality of flow ports, and one or more exit outlets in fluid communication with one or more flow ports other than the selected flow port.

In this embodiment, the flow focusing element comprises a sample flow path between a selected input sampling port, which is in fluid communication with the selected flow port, and the sample line. The sample path may comprise a monolithic structure or a separate assembly. The flow focusing element further comprises one or more bulk flow paths between input sampling ports other than the selected input sampling port and the one or more exit outlets. The flow focusing element is configured to direct gas flowing through the selected input sampling port to flow into the selected flow port and into the sample line, and to direct gas flowing through the input sampling ports other than the selected input sampling port to flow into the one or more flow ports other than the selected flow port and into the one or more exit outlets. Optionally, each of the flow ports is in fluid communication with one of the input sampling ports.

In an embodiment, the sample line is reversibly aligned with the selected flow port of the flow focusing element and may be repositioned during operation to be aligned with a new selected flow port. Thus, repositioning the sample line to be aligned with a new flow port allows a new input sample port to be sampled. Alternatively, the sample line is aligned with the same flow port of the flow focusing element, and the flow focusing element is repositioned during operation so that the selected flow port and sample line are aligned with a new input sample port. Thus, repositioning the flow focusing element, such as by rotating the flow focusing element, allows a new input sample port to be sampled.

The flow focusing element and sample line are preferably positioned and moved using rotation, linear translation, or by sweeping the flow focusing element or sample line back and forth along an arc. As used herein, rotating an object includes rotating the object completely around an axis (360°) and partially around an axis (such as from 0° to 270°, from 0° to 180°, from 0° to 90°, and from 0° to 45°). The object may be continuously rotated in the same direction, or may be rotated in alternating directions. For example, in an embodiment the flow focusing element may be continuously rotated during operation in the same direction (e.g., clockwise or counter clockwise) so that each input sample port is sampled multiple times in sequence, or the flow focusing element may be rotated partially around an axis in one direction and then rotated in the opposite direction.

The flow focusing element may be any shape, including but not limited to rectangular, triangular, polygonal, circular, irregular, and elliptical shapes. In an embodiment, the flow focusing element is generally circular or elliptical and is referred to as a flow focusing disk. The selectable flow ports may be arranged in any configuration within the flow focusing element, including but not limited to a line, a grid, or a track, such as a circular, rectangular, or elliptical track within the flow focusing element.

In an embodiment, the flow focusing element is rotatable, where the plurality of selectable ports comprise a sample outlet port and one or more bulk flow distribution ports. The flow focusing element rotates so as to align the sample outlet port (i.e., the selected flow port) with a desired input sampling port to be sampled. The sample flow path is between the selected input sampling port, the sample outlet port and the sample line, and the one or more bulk flow paths are between input sampling ports other than the selected input sampling port and the one or more bulk flow distribution ports.

Alternatively, the flow focusing element is not rotated. Instead, the sample line is moveable relative to the flow focusing element and is able to be aligned with any of the flow ports. Aligning the sample line with a selected flow port allows the corresponding input sampling port to be sampled, and moving the sampling line to a new selected flow port allows a different input sampling port to be sampled. The sample line may be positioned in relation to the flow focusing element using an actuator as is known in the art.

In an embodiment, the present invention provides a sampling manifold comprising: a) two or more input sampling ports; b) a sealed bulk flow section connected to the two or more input sampling ports, wherein gas flowing through the two or more input sampling ports enters the sealed bulk flow section; c) a rotatable flow focusing disk inside the sealed bulk flow section, the flow focusing disk comprising a sample outlet port and one or more bulk flow distribution ports, wherein the flow focusing disk is able to be rotated within the sealed bulk flow section so the sample outlet port is aligned with an input sampling port selected from the two or more input sampling ports; and d) a sample line in fluid communication with the sample outlet port.

In this embodiment, the flow focusing disk forms a sample flow path between the selected input sampling port and the sample outlet port, and forms one or more bulk flow paths between input sampling ports other than the selected input sampling port and the one or more bulk flow distribution ports. The sample path may comprise a monolithic structure or a separate assembly. Gas flowing through the selected input sampling port flows into the sample outlet port and into the sample line, and gas flowing through the input sampling ports other than the selected input sampling port flows into the one or more bulk flow distribution ports and into an exit outlet. Gas can be pushed or drawn through the manifold using means as known in the art, including but not limited to pumps and vacuum lines. The sample line is preferably in fluid communication with a particle counter, condensation particle counter, gas analyzer, particle analyzer, molecular sampler, microorganism collection plate, environmental or gas sensor, or similar components, and the exit outlet is optionally a house vacuum line or other vacuum source.

In the embodiments above, the transport of gas into the one or more bulk flow distribution ports, into the aligned sample outlet port, through the one or more bulk flow paths, through the sample flow path, or combinations thereof, comprises laminar flow. It is believed the resulting laminar flow reduces the probability of cross talk between different gas pathways and results in a more efficient sampling process.

The flow focusing element in the embodiments described herein optionally comprises a plurality of channels forming the sample flow path and one or more bulk flow paths, where the dimensions of the plurality of channels are configured to direct gas from non-sampled ports away from the sample flow path. In an embodiment, the plurality of channels comprise concentric channels surrounding the flow ports, sample outlet ports, and bulk flow distribution ports. Preferably, the plurality of channels produce laminar flow of gas passing through the flow focusing element. For example, the diameter of the channels forming the one or more bulk flow paths is large enough to produce a laminar flow of gas between the input sampling ports and the one or more bulk flow distribution ports. Similarly, the diameter of one more channels forming the sample flow path is large enough to produce a laminar flow of gas between the selected input sampling port and the sample outlet port. In an embodiment, the channels comprise walls or surfaces extending in the longitudinal direction, where the longitudinal direction is generally defined as the direction extending from the front end of the manifold (where the input sample ports are located) toward the back end of the manifold. Without being bound by theory, it is believed the longitudinal walls and surfaces are able to increase the amount of laminar flow through the channels.

In an embodiment, a median diffusion transport path length between the selected input sampling port and an adjacent input sampling port is greater than a mean free travel path of nano-sized particles in the gas, wherein the nano-sized particles have a diameter of less than 100 nm, less than 50 nm, less than 20 nm, or less than 10 nm. In certain scenarios, the difference in path length is believed to reduce the probability of cross talk between different gas pathways Preferably the median diffusion transport path length between the selected input sampling port and an adjacent input sampling port is at least ten times greater than a mean free travel path of any nano-sized particles in the gas.

In the embodiments described herein, preferably, gas flow between the sample flow path and the one or more bulk flow paths in the flow focusing element has a cross talk rate of less than 0.01%, a cross talk rate less than 0.001%, or a cross talk rate of less than 0.0001%.

The gas flow through the sample flow path and the one or more bulk flow paths is typically between approximately 0.0035 cubic feet/minute (approximately 0.1 liters/minute) and 10.59 cubic feet/minute (approximately 300 liters/minute), preferably between approximately 0.035 cubic feet/minute (approximately 1.0 liters/minute) and 3.5 cubic feet/minute (approximately 100 liters/minute), with the bulk flow typically being 1.0 times the sample flow or greater, 1.2 times the sample flow or greater, 1.5 times the sample flow or greater, or 2.0 times the sample flow or greater. In an embodiment, the bulk flow is 1.5 time to 3.0 times the sample flow. Preferably the gas flow through the sample flow path is less than approximately 1.0 cubic feet/minute (approximately 2.83 liters/minute), or between approximately 0.1 cubic feet/minute and 1.0 cubic feet/minute (approximately 2.83 liters/minute and 28.3 liters/minute). The gas flow through the one or more bulk flow paths is preferably between approximately 0.0035 cubic feet/minute and 10.59 cubic feet/minute (approximately between 0.1 liters/minute and 300 liters/minute).

The manifold can have multiple input sampling ports, such as through the front manifold plate, where an input sampling port is selected to be in fluid communication with the sample outlet port (i.e., the sample flow path), and the unselected input sampling ports are in fluid communication with the one or more bulk flow distribution ports (i.e., the one or more bulk flow paths). For example, the manifold may have 2 or more, 3 or more, 4 or more, 5 or more, 6 or more, 7 or more, 8 or more, 9 or more, 10 or more, 12 or more, 15 or more, 18 or more, 20 or more, 25 or more, 30 or more, 35 or more, 40 or more, 45 or more, 50 or more, 55 or more, 60 or more, 65 or more, 75 or more, 85 or more, or 100 or more input sampling ports. In an embodiment, the manifold comprises up to 64 sample input ports. In an embodiment, there will only be one sample outlet port, with the remaining input sampling ports being in fluid communication with the bulk flow distribution ports; however, in an alternate embodiment, the sampling manifold comprises multiple sample outlet ports that are in fluid communication with selected input sampling ports.

In an embodiment, the manifold comprises 4 or more input sampling ports, and the flow focusing element comprises a sample outlet port and 3 or more bulk flow distribution ports; or the manifold comprises 6 or more input sampling ports, and the flow focusing element comprises a sample outlet port and 5 or more bulk flow distribution ports; or the manifold comprises 10 or more input sampling ports, and the flow focusing element comprises a sample outlet port and 9 or more bulk flow distribution ports; or the manifold comprises 20 or more input sampling ports, and the flow focusing element comprises a sample outlet port and 19 or more bulk flow distribution ports; or the manifold comprises 40 or more input sampling ports, and the flow focusing element comprises a sample outlet port and 39 or more bulk flow distribution ports; or the manifold comprises 60 or more input sampling ports, and the flow focusing element comprises a sample outlet port and 59 or more bulk flow distribution ports.

The input sampling ports are preferably, not essentially, evenly positioned through the flow focusing element, such as along an outer circumference of the flow focusing element. The sample outlet port and bulk flow distribution ports can be any shape able to efficiently transport gas. The sample outlet port and the bulk flow distribution ports may be any shape able to permit flow through the ports, including but not limited to, circular, elliptical, and honeycomb shapes.

In an embodiment, each input sampling port is in fluid communication with a different sample point in a sampled environment. Examples of different sample points include, but are not limited, to different clean rooms, different regions or areas within a room or clean zone, different assembly or processing points within a pharmaceutical or semiconductor manufacturing facility, and different areas within a potentially contaminated environment.

Preferably, the sampling manifold is able to intake gas through each of the input sampling ports simultaneously. Gas sampled through selected input sampling ports will be transported to a sample outlet port and then to a sample line connected to a container, particle counter, sampler, or analyzer, while gas sampled though unselected input sampling ports will be transported through the one or more bulk flow distribution ports and into an exit outlet. The flow focusing element is able to be rotated so as to align the sample outlet port with new selected input sampling ports in order to select and transport samples from different sampling ports.

The sampling manifold optionally comprises one or more environmental sensors or gas sensors able to sense and/or monitor one or more characteristics of gas being sampled or being transported through the sampling manifold. Such environmental sensors and gas sensors may be positioned at locations including, but not limited to, the point in the environment where gas is being sampled, the exterior of the manifold, the input sample ports, the sample flow path, the bulk flow path, the sample line, and components in fluid communication with the sample line. In an embodiment, the sampling manifold is able to monitor and/or sense the pressure, flow rates, temperature, humidity, or combinations thereof, of gas being sampled and transported through different portions of the manifold. For example, the sampling manifold is able to sense and monitor the pressure and/or flow rate of gas being transported through different portions of the sample flow path and bulk flow path in order to ensure adequate gas flow through the system as a whole and through different input sample ports. If no gas flow is detected at one or more locations, or if the measured pressure or gas flow is below desired levels, then the manifold can be controlled, such as by increasing the vacuum intake, to draw in greater amounts of gas. Sensors for detecting and monitoring gas flow and pressure compatible for use with sampling manifolds and particle counters are known in the art, including but not limited to U.S. Pat. No. 8,800,383 (Thomas Bates). Alternatively, or in addition to, the sampling manifold is able to determine and monitor the temperature and humidity of gas in the environment being sampled as well as gas being transported through different portions of the sample flow path and bulk flow path. Temperature/relative humidity (TRH) sensors compatible for use with sampling manifolds and particle counters are also known in the art.

A controller may be used to rotate the flow focusing element to align the sample outlet port with one or more selected input sampling ports, or to operate the actuator to align the sample line with one or more selected flow ports, according to an operator input or predetermined sequence. As used herein, a controller includes hardware devices, software programs, or combinations thereof, able to move or operate a component of a device. For example, the controller is able to rotate the flow focusing element and align the sample outlet port with each of the input sampling ports, or, in the case where the flow focusing element does not rotate, align the sample line with the selected flow ports, for a predetermined time period, frequency, or combination thereof. The time periods and frequency each input sample port is sampled may be fixed or variable.

Each of the input sampling ports may be sampled in a sequential order through continuous rotation of the flow focusing element or through continuous operation of the actuator. Alternatively, the input sampling ports may be sampled in different patterns, in random order, or in a manner that preferentially samples some input sampling ports over others. For instance, if samples from a particular input sample port suggest a greater risk of a particulate being present, that input sample port may be sampled with greater frequency. In an embodiment, the sample outlet port, or sample line, is aligned with one or more of the input sampling ports with greater frequency or longer period of times than other input sampling ports.

The controller is able to rotate the flow focusing element or control the actuator to sample the desired input sampling ports according to a predetermined scanning pattern, such as stored on a computer processor, flash memory, or computer memory. In certain configurations, the computer processor or computer memory is part of the manifold, preferably a part of the manifold that is not the docking station. In certain configurations, flash memory used to control or partially operate the manifold and flow focusing element is located on a removable docking station.

Optionally, the selected input sampling ports are determined by the controller, a user, in a programmed response to an external event, or combinations thereof. The controller is able to rotate the flow focusing element or operate the actuator so as to sample the input sampling ports according to a first scanning pattern, but upon receiving an event signal from an external source, such as data, electrical signals or computer signals from a particle counter, sampler, analyzer, sensor, user interface, mechanical switch, dry contact switch or another electrical switch, alter the rotation of the flow focusing element to so as to align the sample outlet port with the input sampling ports according to a new scanning pattern.

One or more electrical or optical indicators, or an alpha numeric display, may be used to display which input sampling port is being sampled or by displaying the positions of the sample outlet port relative to one or more of the input sampling ports. Suitable electrical or optical indicators include, but are not limited to, lights positioned on the flow focusing element or manifold exterior able to display colors, flashing frequency, or combinations of both.

In an embodiment, the sampling manifold further comprises a hollow shaft motor comprising a housing, where the hollow shaft motor is able to rotate the flow focusing element within the sealed bulk flow section. The sample line is optionally partially contained within the housing of the hollow shaft motor.

In an embodiment, the present invention provides a method for sampling gas comprising the steps of: a) intaking a gas into a manifold, wherein the manifold comprises two or more input sampling ports, a flow focusing element, and a sample outlet port located on the flow focusing element and connected to a sample line; b) rotating the flow focusing element to align the sample outlet port with a selected input sampling port; c) transporting gas through the selected input sampling port into the aligned sample outlet port and into a sample line.

In an embodiment, the present invention provides a method for sampling gas comprising the steps of: a) intaking a gas into a manifold, wherein the manifold comprises two or more input sampling ports, a flow focusing element, a plurality of flow ports located on the flow focusing element, and a sample line able to be aligned with each of the plurality of flow ports; b) controllably moving the sample line to align the sample line with a selected flow port; and c) transporting gas through the selected input sampling port into the aligned flow port and into the sample line.

The above methods further comprise transporting gas through input sampling ports other than the selected input sampling port into one or more non-sampled ports on the flow focusing element and into the exit outlet. In an embodiment, the method comprises intaking gas through each of the input sampling ports simultaneously.

Preferably, the gas is transported into the aligned sample outlet port, sample line, and/or the non-sampled ports using laminar flow. The gas flow between the sample flow path (i.e., into the aligned sample outlet port or selected flow port) and the one or more bulk flow paths (i.e., into the one or more non-sampled ports) in the flow focusing element preferably has a cross talk rate of less than 0.01%, a cross talk rate less than 0.001%, or a cross talk rate of less than 0.0001%

In a further embodiment, the method further comprises rotating the flow focusing element so as to align the sample outlet port with one or more selected input sampling ports according to an operator input or predetermined sequence. In an embodiment, the method comprises aligning the sample outlet port with each of the input sampling ports for a predetermined time period, frequency, or combination thereof, such as sampling each input sampling port at least once per second and/or sampling each of the input sampling ports in a sequential order. Optionally, the sample outlet port is aligned with one or more of the input sampling ports with greater frequency or longer period of times than other input sampling ports.

Alternatively, the method further comprises operating the actuator so as to align the sample line with one or more selected flow ports according to an operator input or predetermined sequence. In an embodiment, the method comprises aligning the sample line with each of the selected flow ports for a predetermined time period, frequency, or combination thereof, such as sampling each selected flow port and therefore the corresponding input sampling port at least once per second and/or sampling each of the input sampling ports in a sequential order. Optionally, the sample line is aligned with one or more of the selected flow ports with greater frequency or longer period of times than other flow ports.

The above methods optionally further comprise receiving an event signal from an external source, and altering the rotation of the flow focusing element (or altering the operation of the actuator) so as to align the sample outlet port with the input sampling ports (or to align the sample line with the selected flow ports) according to a new scanning pattern. The external source includes, but is not limited to, particle counters, samplers, analyzers, sensors, user interfaces, mechanical switches, and dry contact switches or other electrical switches. In an embodiment, the scanning patterns are stored on a computer processor, computer memory, or flash memory. In certain configurations, the computer processor or computer memory is part of the manifold, preferably a part of the manifold that is not the docking station. In certain configurations, flash memory used to control or partially operate the manifold and flow focusing element is located on the docking station.

In an embodiment, the manifold further comprises a removable docking station comprising connections able to operate the sampling manifold, wherein the connections comprise one or more of a vacuum connection, a power connection, a data connection, an analog input/output connection, a digital input/output connection, an ethernet switch connection, wireless communication connection, or any combination thereof. Optionally, the docking station further comprises an internet protocol address and internet connection.

The manifold and methods of using the manifold described herein are used to sample aerosols, air and other gases for the detection, collection and analysis of contaminants and other molecules, including particles having sub 10 nm particle size and greater, and for the detection and analysis of individual component gases within the sampled aerosol, air or gas. For example, collected samples may be sent to a particle counter, such as a condensation particle counter, to detect the level of particles in the collected sample. Alternatively, the collected sample may be sent to an analyzer able to detect the presence of organic molecules or able to identify the presence of one or more specific gas components.

DETAILED DESCRIPTION OF THE INVENTION

Definitions

Figure 1:
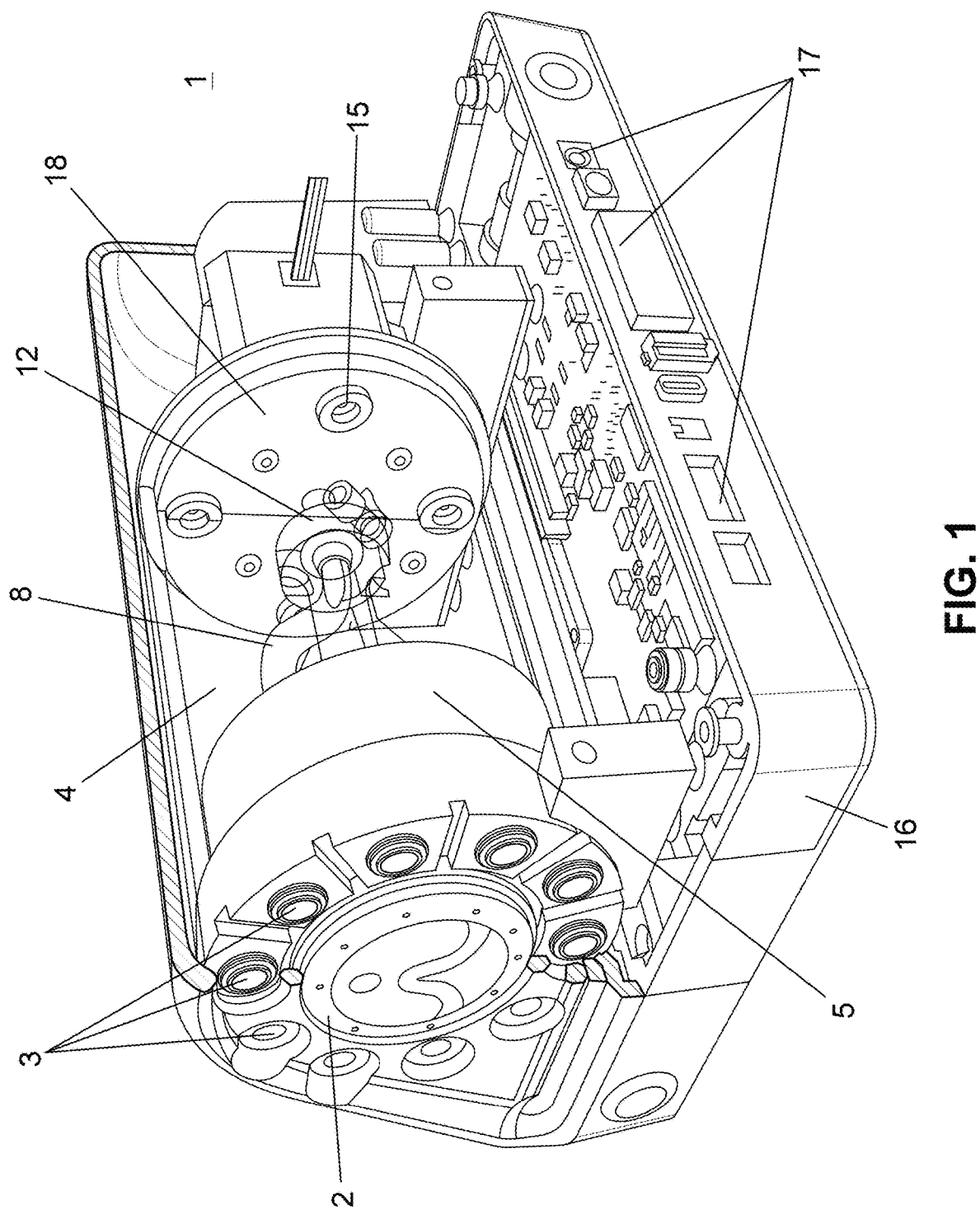
FIG. 1 shows a manifold system in an embodiment of the present invention with an attached docking station.

In general, the terms and phrases used herein have their art-recognized meaning, which can be found by reference to standard texts, journal references and contexts known to those skilled in the art. The following definitions are provided to clarify their specific use in the context of the invention.

As used herein, "laminar flow" refers to fluid (gas or liquid) flow in which the fluid travels smoothly or in regular paths, in contrast to turbulent flow, in which the fluid undergoes irregular fluctuations and mixing. In laminar flow, velocity, pressure, and other flow properties at each point in the fluid remain substantially constant.

"Fluid communication" refers to a connection or pathway where a fluid (gas or liquid) is able to pass from one component to another.

The term "component gas" refers to one or more gases in a gas or aerosol mixture.

The term "particle" or "particles" refers to small objects which are often regarded as contaminants. A particle can be, but need not be, any material created by the act of friction, for example when two surfaces come into mechanical contact and there is mechanical movement. Particles can be single components, or composed of aggregates of material, such as dust, dirt, smoke, ash, water, soot, metal, oxides, ceramics, minerals, or any combination of these or other materials or contaminants. "Particle" or "particles" may also refer to biological particles, for example, viruses, spores, or microorganisms including bacteria, fungi, archaea, protists, or other single cell microorganisms. In some embodiments, for example, biological particles are characterized by a size dimension (e.g., effective diameter) of 1 nm and greater, preferably less than 100 nm, less than 50 nm, less than 20 nm, less than 10 nm, less than 7 nm, less than 5 nm, or less than 3 nm. A particle may refer to a small object which absorbs, emits or scatters light and is thus detectable by a particle counter or an optical particle counter. As used herein, "particle" or "particles" is intended to be exclusive of the individual atoms or molecules of a carrier fluid or sample medium, for example, water, air, process liquid chemicals, process gases, nitrogen, oxygen, carbon dioxide, etc. In some embodiments, particles may be initially present on a surface, such as a tool surface in a microfabrication facility or production surface in a pharmaceutical fabrication facility, liberated from the surface and subsequently analyzed in a fluid.

When disclosing numerical values herein, for example, 1, 2, 3, 4, 5, 6, 7, 8, 9, 10, any of the foregoing numbers can be used singly to describe a single point or an open-ended range, or can be used in combination to describe multiple single points or a close-ended range. This sentence means that each of the aforementioned numbers can be used alone (e.g., 4), can be prefaced with the word "about" (e.g., about 8), prefaced with the phrase "at least about" (e.g., at least about 2), prefaced with the phrase "at least" (e.g., at least 10), prefaced with the phrase "less than" (e.g., less than 1), prefaced with the phrase "less than about" (e.g., less than about 7), or used in any combination with or without any of the prefatory words or phrases to define a range (e.g., 2 to 9, about 1 to 4, at least 3, 8 to about 9, 8 to less than 10, about 1 to about 10, and so on). Moreover, when a range is described as "about X or less," this phrase is the same as a range that is a combination of "about X" and "less than about X" in the alternative. For example, "about 10 or less" is the same as "about 10, or less than about 10." Such interchangeable range descriptions are contemplated herein. Other range formats may be disclosed herein, but the difference in formats should not be construed to imply that there is a difference in substance.

As used herein, the terms "approximately" and "about" means that slight variations from a stated value may be used to achieve substantially the same results as the stated value. In circumstances where this definition cannot be applied or is exceedingly difficult to apply, then the term "about" means a 10% deviation (plus or minus) from the stated value.

Overview

In the following description, numerous details of the devices, device components and methods in certain embodiments of the present invention are set forth in order to provide a thorough explanation of the precise nature of the invention. It will be apparent, however, to those of skill in the art that the invention can be practiced without these specific details.

Aspects of the invention as described in the examples below provide a compact intelligent manifold that combines the elements of sample stream flow, bulk flow, a flow focusing element and sampling intelligence. In these examples, the sample flow is air or gas taken from a single sample point, transported through a flow focusing element and ultimately to a container, particle counter, sampler, or analyzer. The bulk flow is air or gas taken at the same time as the sample flow but from other sample points, i.e., sample points not intended to be counted or analyzed at that specific point in time, and is transported through the flow focusing element without intermixing with the sample flow. The flow focusing element is able to be controlled so as to select different sample points, and enables continuous or near continuous sampling of multiple points within the desired sampling area while limiting cross talk or cross contamination between samples from different sample points. A programmed sampling intelligence is optionally used to control the position of the flow focusing element, or sample line in relation to the flow focusing element, so as to sample air or gas from sample points of interest according to a desired pattern or sequence.

Sampling at low flow rates in manifold systems creates difficulties in preventing cross talk between the different ports as the flow streams in the manifold are less laminar. The flow focusing element utilized in the present invention minimizes diffusion transport between the multiple ports and focuses the system bulk flow to prevent cross talk of large particles.

The flow focusing feature increases flow path isolation thereby reducing potential cross talk between ports which could create data integrity issues from false positives or negatives. Testing done with the flow focusing element design has demonstrated cross talk performance of less than 0.01%, 0.001%, 0.0001% and even less than 0.00001%, for the sampling of nano particle sizes and greater, including particles greater than 100 nm in size.

EXAMPLES

Aspects of the invention can be further understood by the following non-limiting examples and figures.

Example 1—Manifold System Components and Flow Paths

Figure 3:
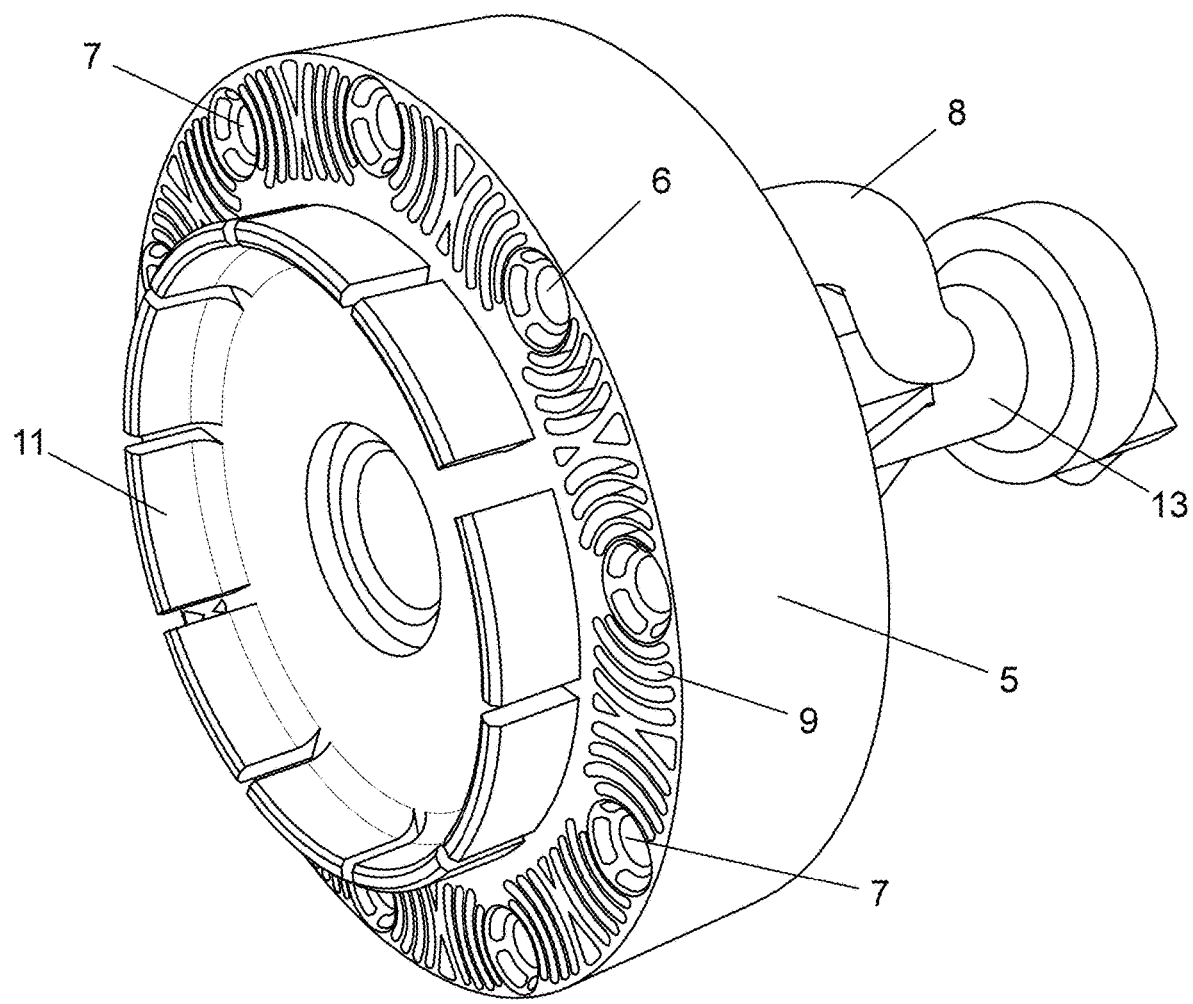
FIG. 3 shows a side view of the flow focusing element in an embodiment, including a sample outlet port connected to a sample line.

As illustrated in FIG. 1, the manifold 1 comprises a front manifold plate 2 having multiple input sampling ports 3 and a back plate 18 with a number of bulk flow exit outlets 15. The number of input sampling ports 3 can vary depending the design of the specific device and intended application. The front manifold plate 2 is connected to a sealed bulk flow section 4, which contains a flow focusing element 5. A sample line 8 exits the flow focusing element 5 and can be integrated within the housing 13 of a hollow shaft motor 12 (see also FIG. 3).

A removable docking station 16 may be attached that contains electrical, mechanical and data connections 17 able to provide easier installation and operation of the manifold system.

Figure 2:
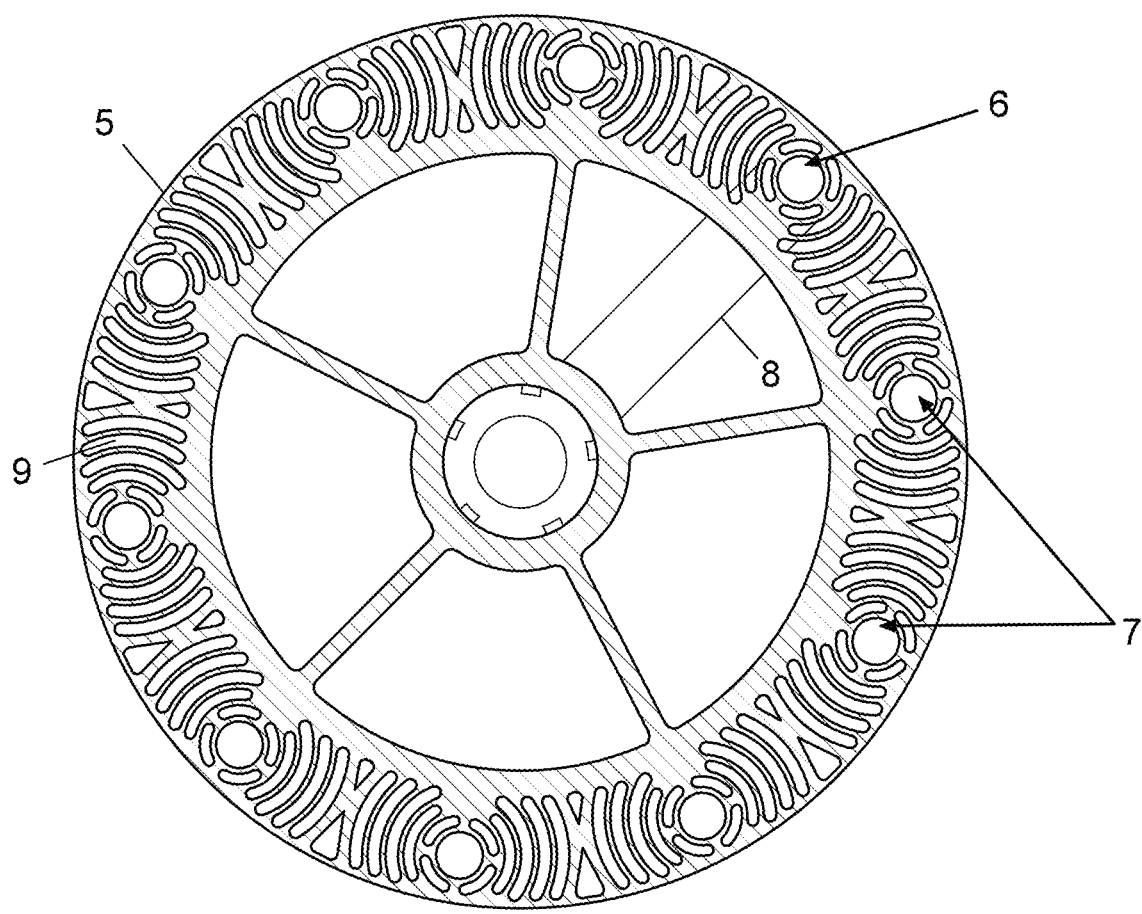
FIG. 2 shows a front view of the flow focusing element in an embodiment with the sample outlet port, bulk flow distribution ports, and plurality of flow channels, where the flow focusing element is in the form of a flow focusing disk.

In one embodiment of the invention, the flow focusing element 5 (see FIGS. 2 and 3) is rotatable and comprises a sample outlet port 6 connected to the sample line 8, and also comprises multiple bulk flow distribution ports 7. A series of channels 9 in the flow focusing element 5 form a sample flow path and bulk flow paths between the input sampling ports 3 and the sample outlet port 6 and bulk flow distribution ports 7. The channels 9 can also be utilized to decrease pressure drops of the gas as it moves through the flow focusing element 5. Although shown in FIGS. 2 and 3 as being a circular disk, the flow focusing element in this embodiment may be any shape, including but not limited to rectangular, triangular, polygonal, circular, and elliptical shapes, able to be rotated.

Figure 8:
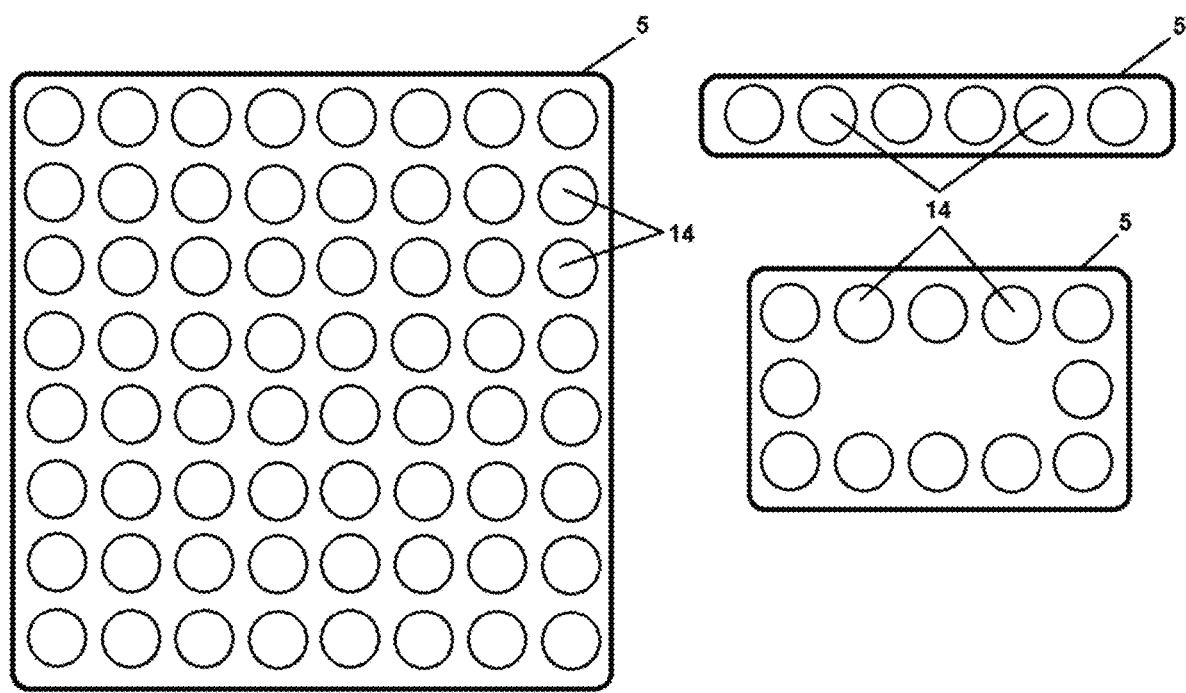
FIG. 8 shows alternative configurations of the flow focusing element in an embodiment of the invention, where the flow focusing element is not rotated. The selectable ports in the fluid focusing element are in fluid communication with inlet sampling ports. Gas is simultaneously drawn through the inlet sampling ports and into each of the selectable ports, and the sample line is aligned with the desired port to be sampled using an actuator.

In an alternate embodiment, as illustrated in FIG. 8, the flow focusing element 5 is not rotated and contains a plurality of selectable flow ports 14. The flow focusing element 5 similarly forms a series of flow paths between the selectable flow ports 14 and the inlet sampling ports 3. Gas is simultaneously drawn through each of the selectable flow ports 14, and an actuator is used to align the sample line 8 with the desired selectable flow port 14 to be sampled. The flow focusing element 5 may be any shape, including but not limited to rectangular, triangular, polygonal, circular, and elliptical shapes, and the selectable flow ports 14 may be arranged in any configuration within the flow focusing element 5. For example, the selectable flow ports 14 may be arranged along a strip where the sample line 8 is aligned with the desired flow ports using a linear actuator. In other examples, the selectable flow ports 14 may be arranged along a track or in a grid system (see FIG. 8). The sample line 8 is able to be aligned with the selectable flow ports 14 in sequential or non-sequential order.

In both embodiments described above, sample flow gas travels through sample tubing into a connected input sampled port 3 on the front manifold plate 2. The sample gas enters the sealed bulk flow section 4 and is focused through the sample outlet port 6 or desired selectable port 14 into the sample line 8 by the flow focusing element 5 while non-sample gas is pushed away from the sample line 8. The sample line 8 carries the sample to a particle counter (not shown).

Bulk flow gas travels through the sample tubing of other input sampled ports 3 on the front plate 2 of the manifold. The bulk flow gas enters the sealed bulk flow section 4 and is forced away from the sample outlet port 6 or desired selectable port 14 and sample line 8 through laminarization of the bulk flow through the flow focusing element 5. Once past the flow focusing element 5 the bulk flow gas is split between the bulk flow exit outlets on the back plate 18 and then to a house vacuum line.

The manifold system 1 may also contain a status indication system having a series of electrical or optical indicators 11, such as on the flow focusing element 5 or front plate of the manifold 2. The electrical or optical indicators 11 may be used to display the position of the flow focusing element 5, the input sample port 3 being sampled, the position of the sample outlet port 6 and bulk flow distribution ports 7, or combinations thereof.

Figure 4:
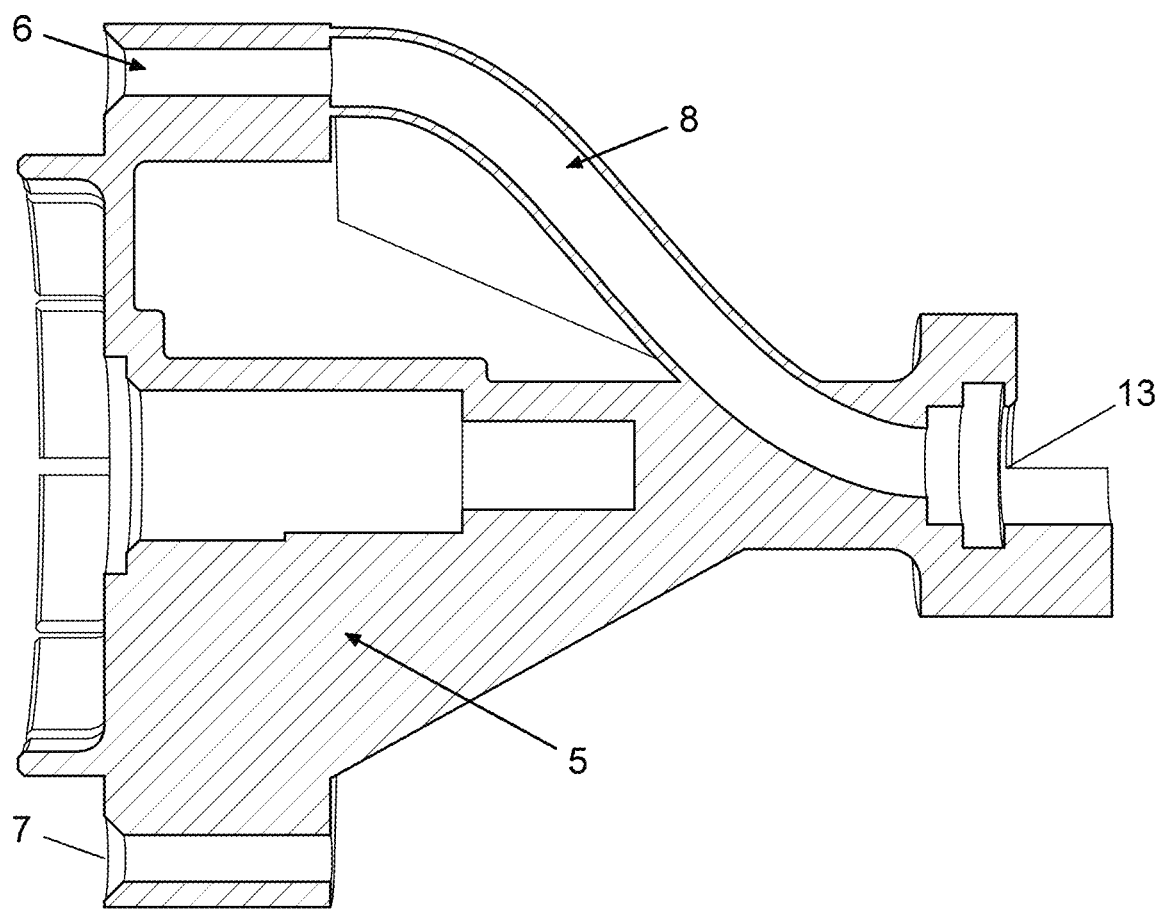
FIGS. 4-6 show different cross sectional views of an embodiment of the invention with the flow focusing element and sampling line being show in relation to the hollow shaft motor.
Figure 5:
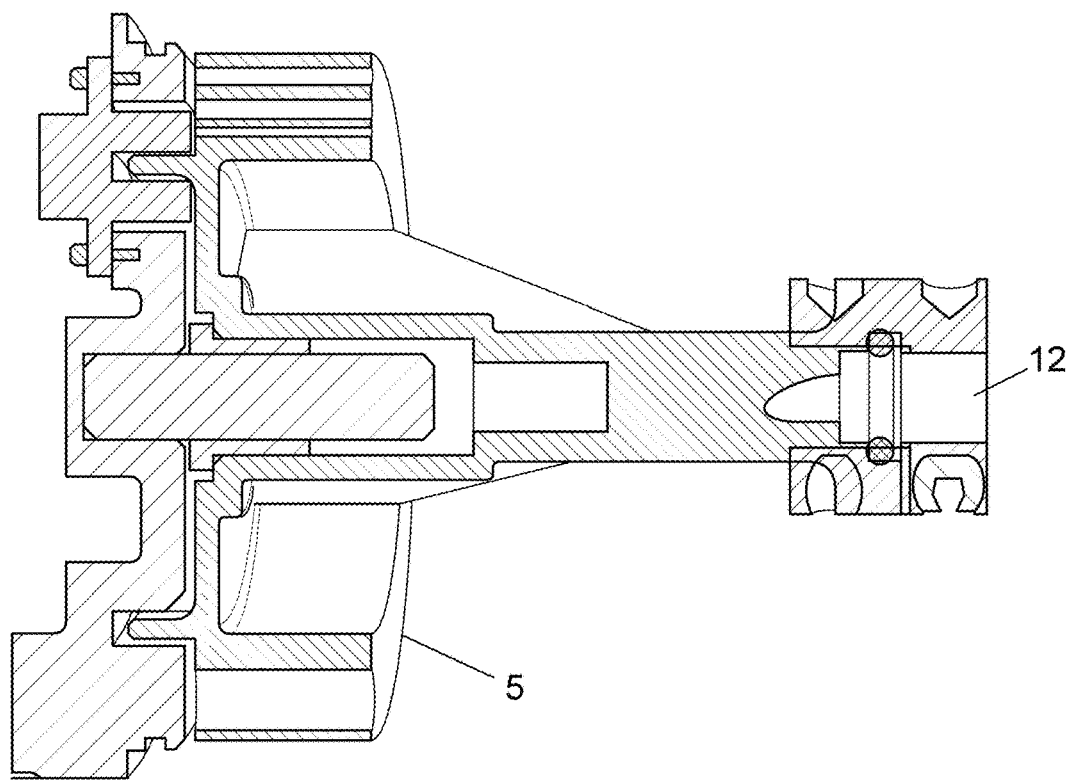
Figure 6:
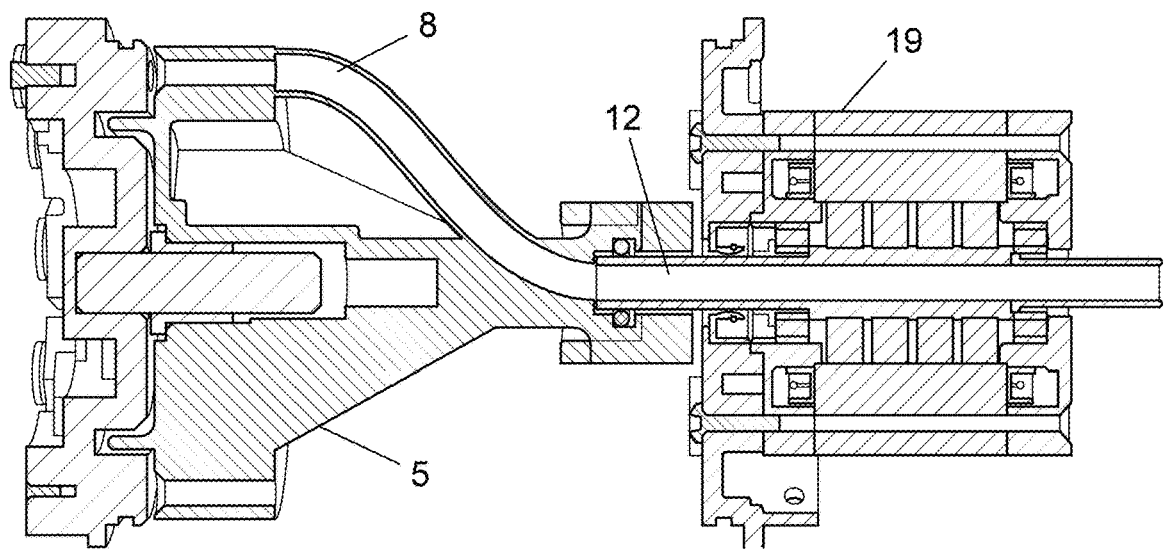

In an embodiment, the flow focusing element 5 is attached to a hollow shaft motor 12, which passes through the back plate 18 and into a mounting section 19. FIGS. 4-6 show cross sectional views of the flow focusing element 5 and sampling line 8 in relation to the hollow shaft motor 12.

Figure 7:
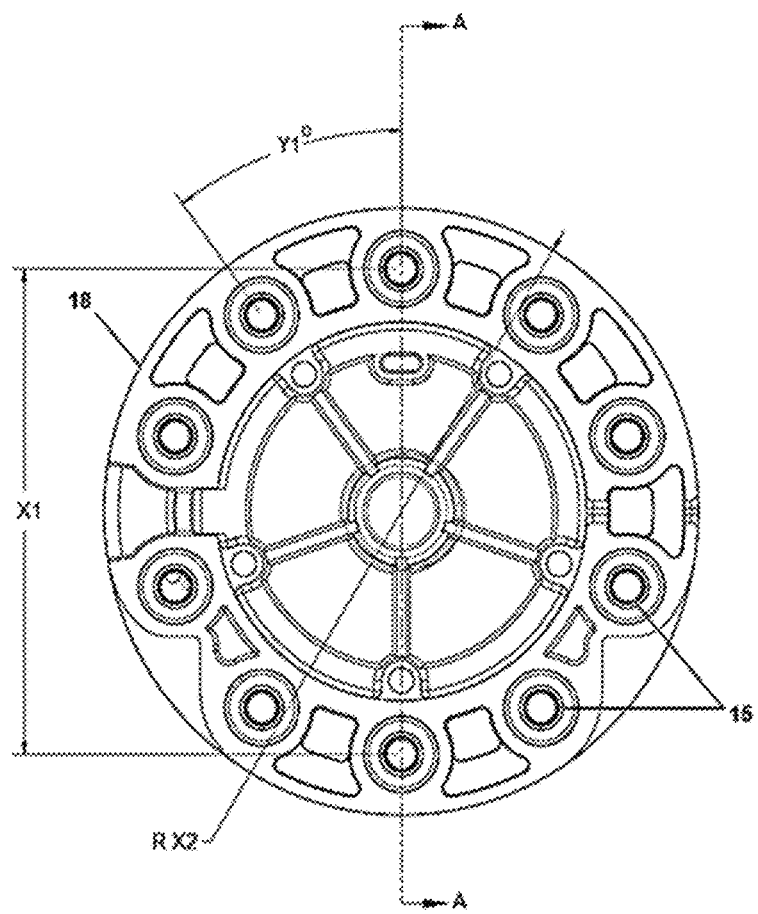
FIG. 7 shows a front and cross sectional view of the back plate of the manifold, and illustrates a connection between the sample line and inlet leading to a particle counter, sampler, or analyzer.
Figure 7:
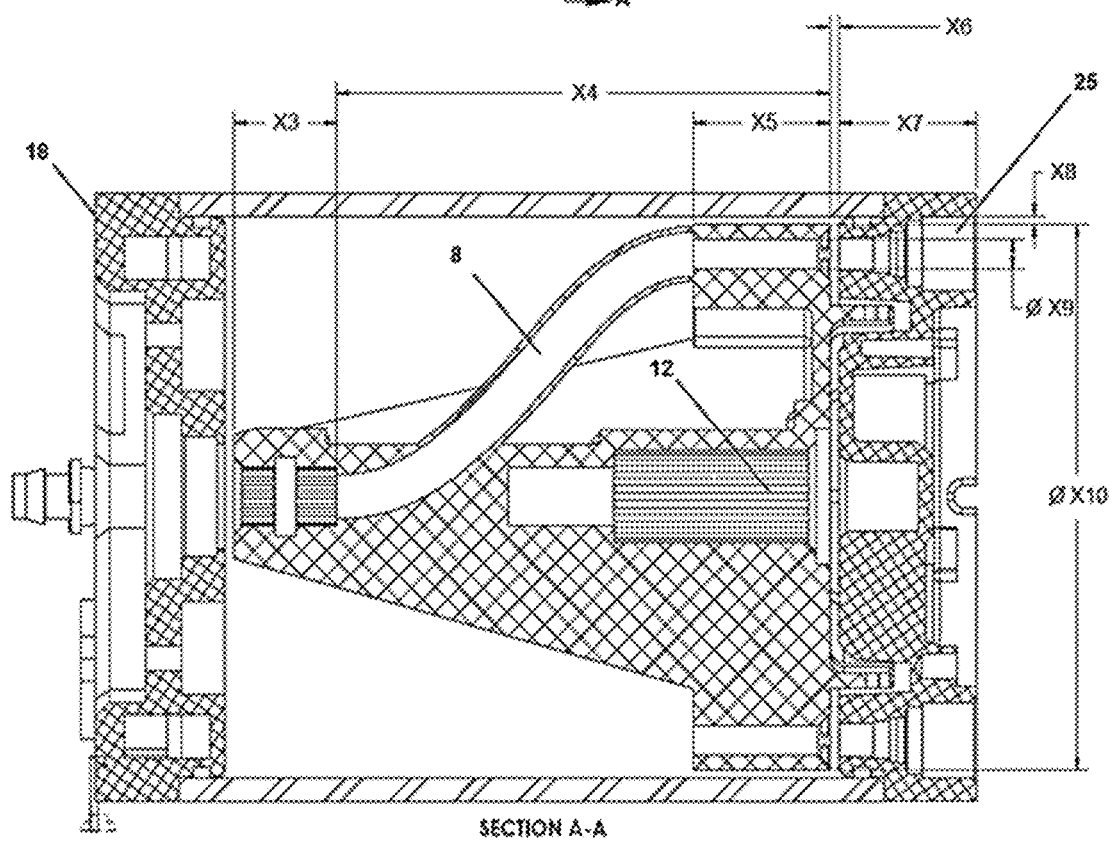

FIG. 7 shows a front and cross sectional view of the back plate 18 of the manifold, exit outlets 15. The sample line 8 from the flow focusing element 5 connects to inlet 25 leading to a particle counter, sampler, or analyzer.

A range of dimensions for the for back plate 18 in an embodiment of the manifold are also illustrated in FIG. 7 where: X1 is between 50-80 mm (preferably between 60-70 mm), X2 is between 30-50 mm (preferably between 38-45 mm), X3 is between 10-20 mm (preferably between 12-16 mm), X4 is between 50-80 mm (preferably between 62-72 mm), X5 is between 14-24 mm (preferably between 16-22 mm), X6 is between 0.5-1.50 mm (preferably between 1.0-1.5 mm), X7 is between 14-24 mm (preferably between 16-22 mm), X8 is between 0.5-1.5 mm (preferably between 0.8-1.3 mm), X9 is between 2-6 mm (preferably between 3-5 mm), X10 is between 55-90 mm (preferably between 65-80 mm), and Y1 is between 24-90° (preferably between 30-40°). Y1 is dependent on the number of exit outlets 15, where the exit outlets 15 are preferably even spaced apart from one another.

Figure 9:
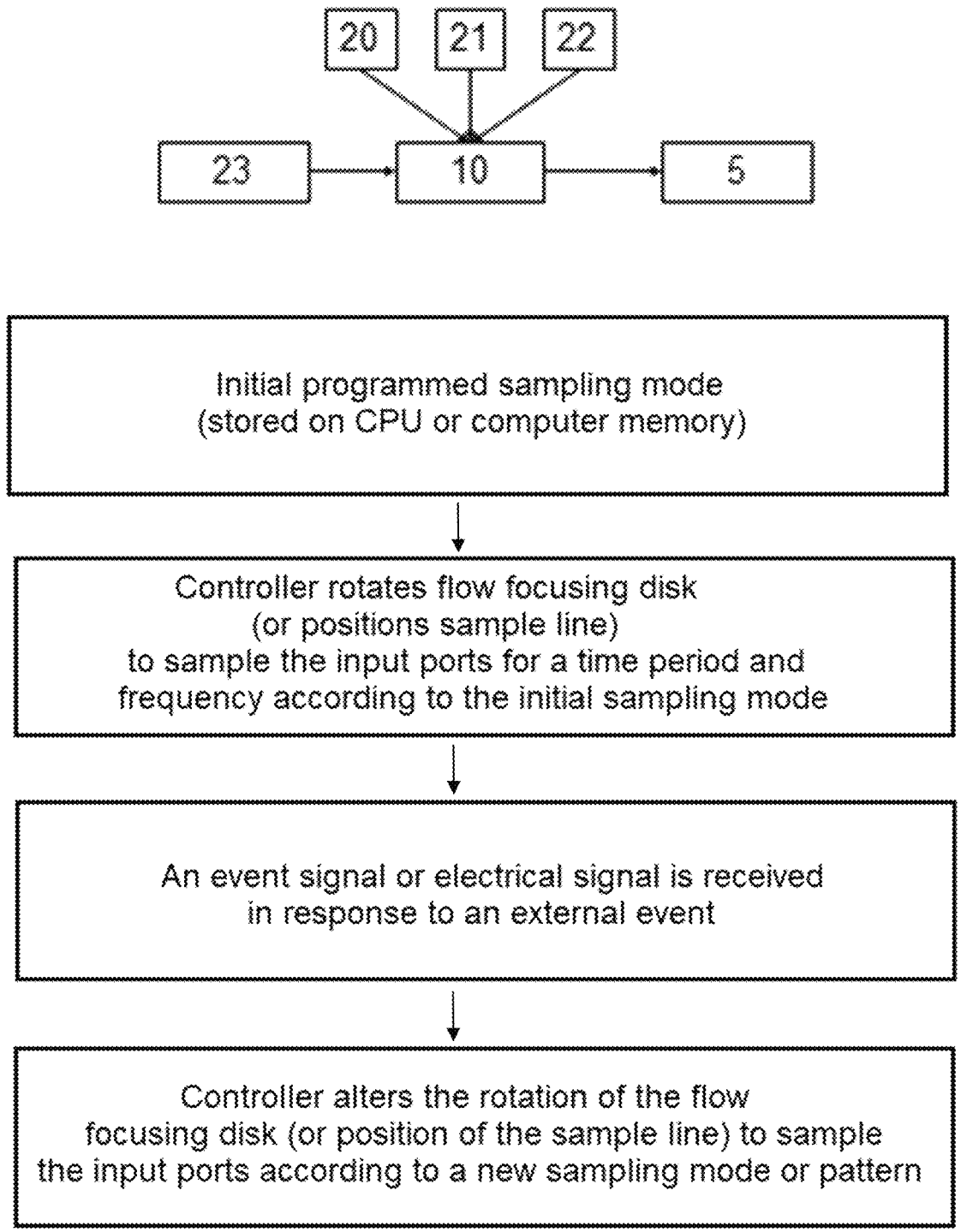
FIG. 9 shows a block diagram (top) of a controller in an embodiment of the invention receiving signals from external sources, such as from a particle counter or other type of sampler or analyzer, and altering the rotation of the flow focusing element in response to these signals, and a flow diagram (bottom) describing the steps of the controller switching to a new sampling mode in response to the received signals

A controller 10 is able to control the rotation of the flow focusing element 5 so as to align the sample outlet port 6 and sample line 8 with the sample input ports 3 according to a desired sampling mode (see FIG. 9). Alternatively, in embodiments where the flow focusing element is not rotated, the controller is able to control the actuator in order to position the sample line 8 with a selectable port 14 in fluid communication with a desired sample input port 3 according to a desired sampling mode. Parameters for an initial sampling mode are stored on a computer processor or computer memory 23 and are transmitted to the controller 10. Alternatively, the controller 10 and the computer processor or computer memory 23 are integrated with one another. The controller 10 is able to receive event signals or electrical signals from external sources, such as a particle counter, sampler, or analyzer 20, a dry contact switch 21, or a user input 21, and switch to a new sampling mode. For example, upon receiving a signal that a threshold level of particles were detected by the particle counter, the controller 10 may cause the flow focusing element 5 to sample the corresponding input sampling port with higher frequency or for longer periods of time.

Example 2—Manifold System Unique Features

Flow Focusing Element. The primary function of the flow focusing element is to minimize cross talk of nano sized particles whose primary mode of aerosol transport is diffusion, and to minimize cross talk of larger particles whose primary mode of aerosol transport is inertial based mechanical mobility. In an example, the flow focusing element is a circular flow focusing disk that fills up to the cross-sectional diameter of the sealed bulk flow section and contains a sample flow passage and bulk flow paths. The flow passages in the flow focusing element are in a pattern to match the positions of the input sample port positions. The dimensions of the flow focusing element should be enough to create laminar flow paths for the bulk gas flow.

The laminar flow paths should be enough for transport of large (>100 nm) particles away from the sample flow. The combination of the gap between the front manifold plate and the flow focusing element and the depth of the flow focusing element needs to be sufficient that the median diffusion transport path length between the active sample port and the adjacent port is greater than the mean free path of nano sized (<20 nm) particles. Flow passages between ports can be utilized to decrease pressure drop on sample port while moving between ports. The gas flow from each sample input port not currently being sampled (i.e., the bulk flow) is one times (1×) or more than the sample flow rate.

Hollow Shaft Motor. The flow focusing element focuses the desired sample gas into a sample line, a portion of which is located within the housing of the hollow shaft motor. The use of a hollow shaft motor provides the dual function of rotating the flow focusing element while simultaneously transporting the sample gas out of the sealed bulk flow section to the sample outlet and particle counter. The hollow shaft motor allows for a more compact design by minimizing particle transport length. The shorter sample path also results in lower particle transport loss.

Status Indication. Data such as sample status and status of the particle counter (or other analyzer or sampler) is transmitted from the particle counter to the manifold over ethernet or serial communications. Visual status indication, including the current sampling position, is also able to be displayed for each individual port simultaneously. Different combinations of color and flashing frequency can be used to indicate different sensor status. Alternatively, an alpha numeric display may be used.

Docking Station. The manifold can be equipped with a docking station that slides into the manifold and may be used as a common component between the manifold and the particle counter (or other related analyzer, sampler, controller or device). The docking station contains the IP address of the device as well as electrical, mechanical and user connections necessary or useful to operate the manifold (e.g., connections for data, analog and digital input/output, ethernet switch, wireless communication, vacuum, and power). The docking station allows for fast service interval swapping of different units with as minimal user interaction as possible.

Example 3—Intelligent Sample Modes

The flow focusing element is able to be rotated (or the actuator controlled) so as to align the sample outlet port and/or sample line with a desired sample input port. A programmed sampling intelligence is used to control the position of the flow focusing element or actuator so as to sample air or gas from different sample input ports according to a desired sampling mode. A non-exhaustive list of useful sampling modes are provided below.

Ensemble sampling mode. In this mode, gas is drawn in by all of the sample input ports simultaneously while the flow focusing element and the sample line are continuously rotated, or while the actuator continuously moves the sample line across the selectable ports. The continuous intake of gas by the input ports while rotating the flow focusing element and sample line (or continuously positioning the sample line by the actuator across the selectable ports) produces an average concentration across all of the sample input ports. In a low concentration environment, the rotational rate or actuator positioning rate is sufficient to produce a high probability of detecting a single particle event from any port with each port being sampled between 1 and 20 times per second.

Selective ensemble mode. This mode is a modification of the ensemble sampling mode and controls the flow focusing element or actuator to spend more time on sample input ports of interest as defined by the user. For example, the flow focusing element may sample a selected input port for a longer period of time than other input ports. This allows for the same sample frequency across the full range of ports while simultaneously providing more detail of higher risk ports.

Sequential sampling mode. In this mode, the flow focusing element is rotated or the actuator is positioned to sample each sample input port in sequential order with a fixed sample duration and fixed sample tare time.

Patterned sampling mode. In this mode, the flow focusing element is rotated or the actuator is positioned to sample input ports according to a programed pattern using variable sample duration and variable sample tare times.

Scanning sampling mode. This mode starts with either the ensemble or sequential sampling mode, until an event signal is received from the connected aerosol particle counter or another external source. Upon receiving the event signal the controller will alter the rotation of the flow focusing element, or alter the positioning of the actuator, to follow a predetermined patterned sampling mode designed to identify the location of the contamination source.

Triggering sample mode. Using a combination of dry contact switches responsive to external events, the controller will switch between different sampling modes or specific sample positions.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All references referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

The invention claimed is:

1. A sampling manifold comprising:
   a) two or more input sampling ports;
   b) a sealed bulk flow section connected to the two or more input sampling ports, wherein gas flowing through the two or more input sampling ports enters the sealed bulk flow section;
   c) a flow focusing element inside the sealed bulk flow section, the flow focusing element comprising a plurality of flow ports, wherein the flow ports are in fluid communication with the input sampling ports;
   d) a sample line in fluid communication with a flow port selected from the plurality of flow ports, and one or more exit outlets in fluid communication with one or more flow ports other than the selected flow port,
   wherein the flow focusing element comprises a sample flow path between a selected input sampling port, which is in fluid communication with the selected flow port, and the sample line, and comprises one or more bulk flow paths between input sampling ports other than the selected input sampling port and the one or more exit outlets;
   the flow focusing element being configured to direct gas flowing through the selected input sampling port to flow into the selected flow port and into the sample line, and to direct gas flowing through the input sampling ports other than the selected input sampling port to flow into the one or more flow ports other than the selected flow port and into the one or more exit outlets.

2. The sampling manifold of claim 1, wherein the flow focusing element comprises a plurality of channels forming the sample flow path and one or more bulk flow paths, wherein the plurality of channels are configured to direct gas from non-sampled ports away from the sample flow path.

3. The sampling manifold of claim 1, comprising 6 or more input sampling ports, and the flow focusing element comprises a sample outlet port and 5 or more bulk flow distribution ports.

4. The sampling manifold of claim 1, wherein the sampling manifold is able to intake gas through each of the input sampling ports simultaneously.

5. The sampling manifold of claim 1 further comprising a particle counter, condensation particle counter, gas analyzer, particle analyzer, molecular sampler, microorganism collection plate, environmental or gas sensor, or combinations thereof, in fluid communication with the sampling line.

6. The sampling manifold of claim 1, wherein the plurality of selectable ports comprise a sample outlet port and one or more bulk flow distribution ports, where the sample outlet port is the selected flow port, and the flow focusing element is able to be rotated within the sealed bulk flow section so the sample outlet port is aligned with an input sampling port selected from the two or more input sampling ports, and
   wherein the sample flow path is between the selected input sampling port, the sample outlet port and the sample line, and the one or more bulk flow paths are between input sampling ports other than the selected input sampling port and the one or more bulk flow distribution ports.

7. The sampling manifold of claim 1, wherein the flow focusing element is able to controllably rotate to align the sample outlet port with a new selected input sampling port.

8. The sampling manifold of claim 1 further comprising one or more electrical or optical indicators, said electrical or optical indicators able to display position of the sample line relative to the plurality of flow ports, or positions of the sample outlet port relative to one or more of the input sampling ports.

9. The sampling manifold of claim 1 further comprising:
   a) a controller operationally connected to the flow focusing element and able to rotate the flow focusing element to align the sample outlet port with one or more selected input sampling ports according to an operator input or predetermined sequence, or
   b) a controller operationally connected to an actuator and able to align the sample line with one or more selected flow ports according to an operator input or predetermined sequence.

10. The sampling manifold of claim 1 wherein the transport of gas through the one or more bulk flow paths gas, sample flow path, or combinations thereof, comprises laminar flow.

11. The sampling manifold of claim 1 further comprising a removable docking station, said docking station comprising connections able to operate the sampling manifold, wherein the connections comprise one or more of a vacuum connection, a power connection, a data connection, an analog input/output connection, a digital input/output connection, an ethernet switch connection, wireless communication connection, or any combination thereof.

12. The sampling manifold of claim 9, wherein the sample outlet port is able to be aligned with each of the input sampling ports through continuous rotation of the flow focusing element, or the sample line aligned with each of the plurality of flow ports through continuous operation of the actuator.

13. The sampling manifold of claim 9, wherein the controller is able to rotate the flow focusing element and align the sample outlet port with each of the input sampling ports for a predetermined time period, frequency, or combinations thereof, or the controller is able to control the actuator to align the sample line with each of the plurality of flow ports for a predetermined time period, frequency, or combinations thereof.

14. The sampling manifold of claim 9, wherein the controller is able to rotate the flow focusing element and align the sample outlet port with each of the input sampling ports, wherein the sample outlet port is aligned with one or more of the input sampling ports with greater frequency or for greater periods of time than other input sampling ports, or the controller is able to control the actuator to align the sample line each of the plurality of flow ports, wherein the sample line is aligned with one or more of the flow ports with greater frequency greater periods of time than other flow ports.

15. The sampling manifold of claim 14, wherein the controller is able to rotate the flow focusing element and align the sample outlet port with the input sampling ports according to a predetermined scanning pattern, or the controller is able to control the actuator to align the sample line with the flow ports according to a predetermined scanning pattern.

16. The sampling manifold of claim 15, wherein the controller is able to receive an event signal from an external source and alter the rotation of the flow focusing element to so as to align the sample outlet port with the input sampling ports according to a new scanning pattern, or alter movement of the sample line so as to align the sample line with the flow ports according to a new scanning pattern.

17. The sampling manifold of claim 15, wherein the controller is able to receive an event signal from a particle counter and rotate the flow focusing element, or move the sample line, according to a new predetermined event pattern upon receiving the event signal.

18. A method for sampling gas comprising the steps of:
a) intaking a gas into a manifold, wherein the manifold comprises two or more input sampling ports, a flow focusing element, and either:
   i) a sample outlet port located on the flow focusing element and connected to a sample line, or
   ii) a plurality of flow ports located on the flow focusing element and a sample line able to be aligned with each of the plurality of flow ports;
b) rotating the flow focusing element to align the sample outlet port with a selected input sampling port, or controllably moving the sample line to align the sample line with a selected flow port; and
c) transporting gas through the selected input sampling port into the aligned sample outlet port or flow port and into the sample line.

19. The method of claim 18, wherein gas flow into the aligned sample outlet port or selected flow port and gas flow into the one or more non-sampled ports have a cross talk rate of less than 0.01%.

20. The method of claim 18 comprising rotating the flow focusing element so as to align the sample outlet port with one or more selected input sampling ports for a predetermined period of time, frequency, or combinations thereof.

21. The method of claim 18 comprising rotating the flow focusing element so as to align the sample outlet port with one or more selected input sampling ports according to a predetermined pattern.

22. The method of claim 18, wherein the flow focusing element is rotated to align the sample outlet port according to inputs stored on a computer processor, flash memory or computer memory.

23. The method of claim 18, wherein the sampling line is in fluid communication with a particle counter, condensation particle counter, gas analyzer, particle analyzer, molecular sampler, microorganism collection plate, environmental or gas sensor, and combinations thereof.

24. The method of claim 21 comprising receiving an event signal from an external source and altering the rotation of the flow focusing element to so as to align the sample outlet port with the input sampling ports according to a new scanning pattern.

25. A sampling manifold comprising:
a) two or more input sampling ports;
b) a sealed bulk flow section connected to the two or more input sampling ports, wherein gas flowing through the two or more input sampling ports enters the sealed bulk flow section;
c) a rotatable flow focusing disk inside the sealed bulk flow section, the flow focusing disk comprising a sample outlet port and one or more bulk flow distribution ports, wherein the flow focusing disk is able to be rotated within the sealed bulk flow section so the sample outlet port is aligned with an input sampling port selected from the two or more input sampling ports; and
d) a sample line in fluid communication with the sample outlet port, wherein the flow focusing disk comprises a sample flow path between the selected input sampling port and the sample outlet port, and comprises one or more bulk flow paths between input sampling ports other than the selected input sampling port and the one or more bulk flow distribution ports, wherein the sample path comprises a monolithic structure or a separate assembly, and
the flow focusing disk being configured to direct gas flowing through the selected input sampling port to flow into the sample outlet port and into the sample line, and to direct gas flowing through the input sampling ports other than the selected input sampling port to flow into the one or more bulk flow distribution ports and into an exit outlet.

26. The sampling manifold of claim 25, wherein the diameter of the channels forming the one or more bulk flow paths is large enough to produce a laminar flow of gas between the input sampling ports and the one or more bulk flow distribution ports.

27. The sampling manifold of claim 26, wherein the diameter of one more channels forming the sample flow path is large enough to produce a laminar flow of gas between the selected input sampling port and the sample outlet port.

28. The sampling manifold of claim 25 further comprising a hollow shaft motor comprising a housing, said hollow shaft motor able to rotate the flow focusing disk within the sealed bulk flow section, wherein the sample line is at least partially contained within the housing of the hollow shaft motor.

29. The sampling manifold of claim 25, wherein gas flow between the sample flow path and the one or more bulk flow paths has a cross talk rate of less than 0.01%.

* * * * *